W. T. ROSS.
NUT LOCK.
APPLICATION FILED SEPT. 27, 1915.

1,210,844.

Patented Jan. 2, 1917.

WITNESSES:
O. Johnson
A. Haskins

INVENTOR
Walter T. Ross

BY
C. D. Haskins
ATTORNEY

UNITED STATES PATENT OFFICE.

WALTER T. ROSS, OF VANCOUVER, BRITISH COLUMBIA, CANADA.

NUT-LOCK.

1,210,844.  Specification of Letters Patent.  Patented Jan. 2, 1917.

Application filed September 27, 1915. Serial No. 52,760.

*To all whom it may concern:*

Be it known that I, WALTER T. ROSS, citizen of the Dominion of Canada, residing at Vancouver, in the Province of British Columbia, Canada, have invented a certain new and useful Improvement in Nut-Locks, of which the following is a specification.

My invention relates to improvements in nuts for bolts, and the object of my improvements is to provide a nut that shall be adapted by its form to be screwed on to the screw-threaded portion of the shank of a bolt to a desired position and there be locked against a backward turning movement, notwithstanding vibrations, shocks and concussions to which such bolt may be subjected under normal conditions of use, by slightly distorting, bruising or displacing the apex of the screw-thread of the shank of such bolt at one or more circumferential points adjacent to certain projecting parts of said nut.

A further object is to make such nut integral with all its parts and of such form as will adapt it to be forged and threaded at no greater cost than that of common forms of nuts for like employment.

I attain these objects by devices illustrated in the accompanying drawings wherein—

Figure 1:
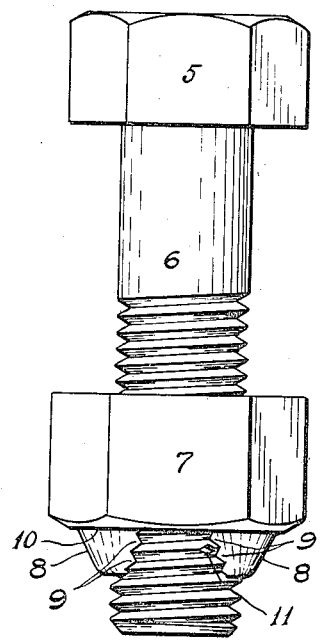
Figure 2:
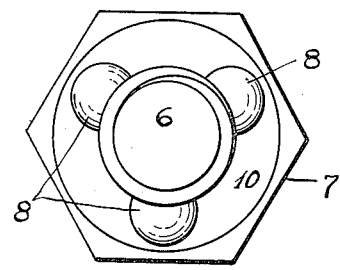

Figure 1 is a view in side elevation of a bolt upon which is disposed a nut embodying my invention; and Fig. 2 is an end view of the shank of said bolt with the same nut disposed thereon whereby is shown a plan view of the outer face of said nut.

Referring to the drawings, throughout which like reference numerals indicate like parts, 5 is the head of a bolt upon whose screw-threaded shank 6 is disposed a hexagonal nut 7, the inner faces of which bolt head 5 and hexagonal nut 7 being adapted to engage with the surfaces of the objects (not shown) which are to be bolted together.

The hexagonal nut 7 is provided with a plurality of pointed fingers 8 which are integral therewith and which project from the outer face 10 thereof at equi-distant points adjacent to the edge of its screw-threaded hole, and the inner side surface of each of said fingers 8 is provided with screw-threads 9 which are incidentally formed when in the operation of manufacture the screw-thread of said nut 7 is formed by a screw cutting tap, whereby said screw-threads 9 may engage with the screw-threads of the shank 6 of the bolt, as more clearly shown in Fig. 1. In the operation of locking said nut in its position on the screw-threaded shank 6 of a bolt, with its inner face against an object to be bolted, a chisel or set punch is employed to bend or jam a portion of the top of one or more of the convolutions of the screw-thread of the shank 6 immediately adjacent to the edge of one or more of the fingers 8 thereby to form projecting detents, like detent 11 of Fig. 1, which detents by their engagement with the edges of the respective ones of the fingers 8 serve to prevent the nut 7 from turning backwardly on the shank 6 in response to or in consequence of any shocks, vibrations or concussions to which the bolt may be subjected under normal conditions of use. When, however, it is desired to unscrew the nut 7 from its locked position, as shown in Fig. 1, then a wrench is employed to turn the nut 7 backward with sufficient force to cause the fingers 8 to shave off or bend back said detents 11 thereby to smooth the screw-thread of the shank 6 thus permitting a continued rotation of such nut 7 in a direction to unscrew it without mutilating or injuring the screw-thread within the main body of such nut 7. If, after repeated operations of forcibly removing the nuts, the fingers should become damaged, the same may be easily severed from the main body portion of the nut, and the nut be further used in other connections. It will be readily seen that great saving of the nuts is afforded by severing the damaged fingers instead of discarding the entire nut.

Obviously changes may be made in the form and dimensions of the parts of my invention within the scope of the claim without departing from the spirit thereof.

What I claim is:

In combination with a bolt having a screw-threaded shank, of a screw-threaded nut uninterrupted in its body portion threaded on the shank, a plurality of integral non-resilient fingers projecting from the outer face of the nut and having threaded faces engaging the threads of the bolt, the fingers being formed to permit their complete severance from the face of the nut carrying the same without destroying the main body portion of the nut, one of the threads of the bolt being mutilated by having its apex flattened inwardly adjacent one of said fingers and outwardly of the body portion of the nut to provide a detent and to prevent accidental unscrewing of the nut, the said fingers adapted for forceful counter clockwise rotation to restore the mutilated thread to normal condition to permit unscrewing of the nut.

I hereunto subscribe my name this 13th day of September A. D. 1915.

WALTER T. ROSS.